Figure 3:
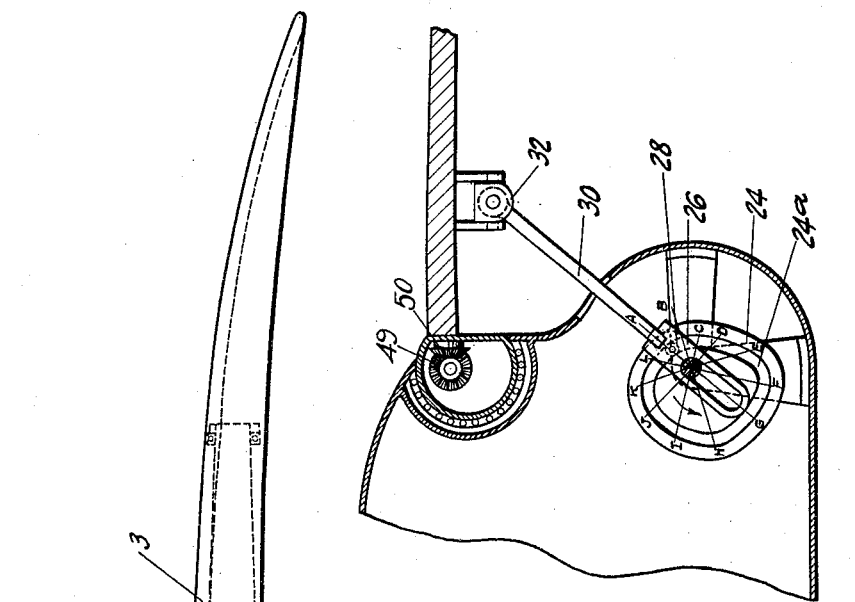

Oct. 25, 1932.                C. W. STROBELL                1,884,909
                                ORNITHOPTER
                  Filed Sept. 4, 1930        3 Sheets-Sheet 1
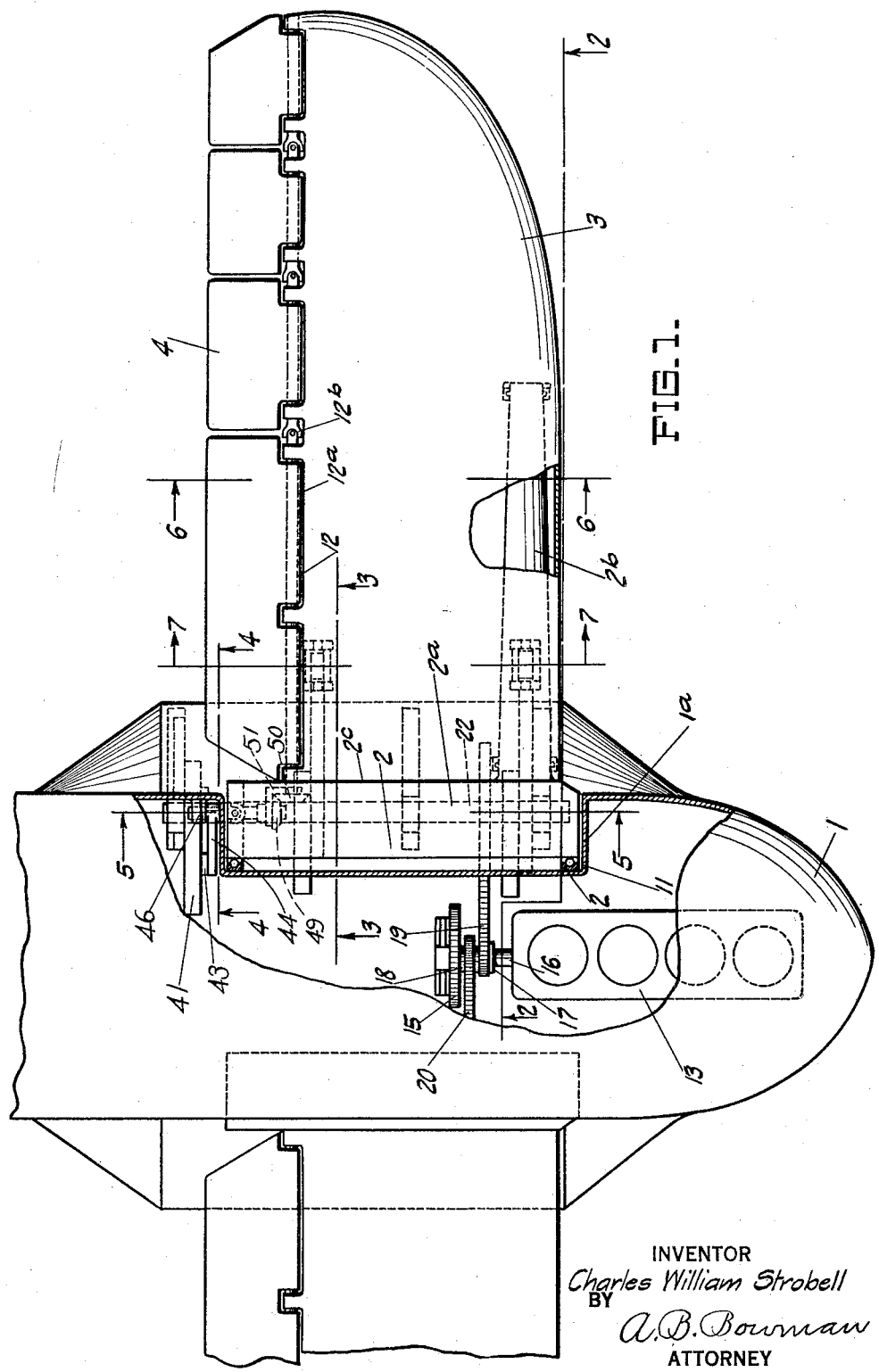
INVENTOR
Charles William Strobell
BY
A. B. Bowman
ATTORNEY Oct. 25, 1932.   C. W. STROBELL   1,884,909
ORNITHOPTER
Filed Sept. 4, 1930   3 Sheets-Sheet 2

INVENTOR
*Charles William Strobell*
BY
*A. B. Bowman*
ATTORNEY

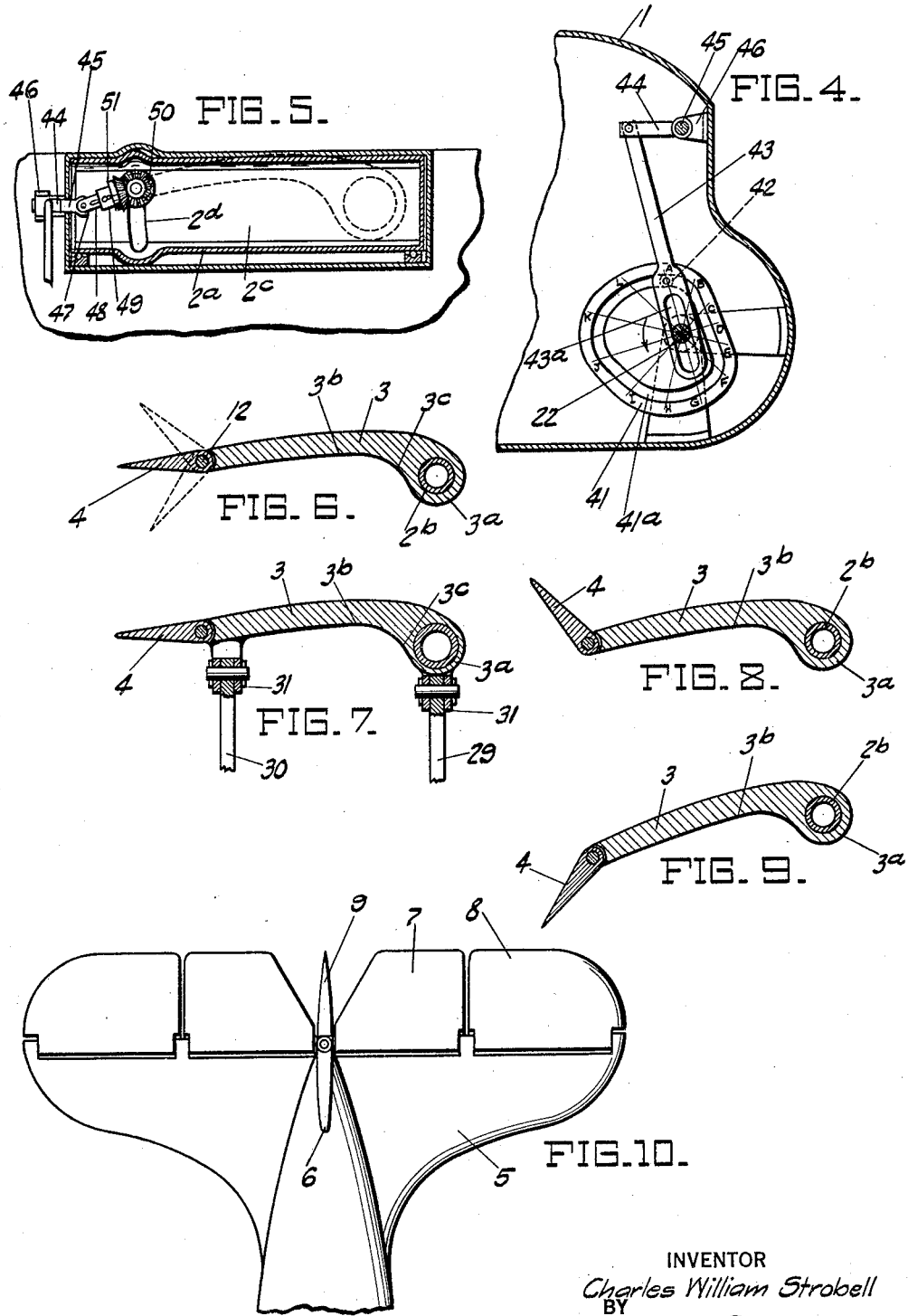

Patented Oct. 25, 1932

1,884,909

UNITED STATES PATENT OFFICE

CHARLES WILLIAM STROBELL, OF SAN DIEGO, CALIFORNIA

ORNITHOPTER

Application filed September 4, 1930. Serial No. 479,687.

My invention relates to aircraft, and particularly to that class of aircraft known as ornithopters.

The objects of this invention are:

First: To provide an ornithopter in which the movement of various portions of the wings, when the aircraft is in flight, closely simulates the movement of the wings of a bird as far as possible, commensurate with strength of construction and ease and efficiency in manipulation.

Second: To provide an aircraft of this class which is capable of taking off from the ground and also capable of landing within a relatively small space.

Third: To provide a wing section having a deep cup or camber at the under side, and in which the camber has an abrupt curve at the forward portion and gradually curved and merged at its rear portion toward the trailing edge of the wing, so as to pocket the air when the wing is forced downwardly and then directed backwardly, causing forward propulsion of the aircraft.

Fourth: To provide novel means for flapping or oscillating the wings so that the upward movement of the wings is effected in a shorter period of time than the downward or lifting movement of the wings, so as to provide more uniform lifting and propulsion of the aircraft.

Fifth: To provide a wing structure for aircraft of this class, in which the leading edge of the wing is raised relative to its trailing edge as the wing is moved upwardly about its pivotal connection to the body or fuselage, so that less resistance is offered to the raising of the wing than during the downward movement of the wing, during which latter movement, the wing is substantially horizontal from the leading to the trailing edge, or tilted slightly upwardly at its trailing edge with respect to the leading edge.

Sixth: To provide a novel and simple mechanism for effecting such tilting of the wing for varying its angle of incidence.

Seventh: To provide an aircraft of this class in which the trailing edge portion of the wing is provided with flaps which are adapted to be directed upwardly or downwardly, depending upon whether the wing is moved downwardly or upwardly, such positions of the flaps in their angular positions causing forward propulsion of the aircraft during both the downward and upward movement of the wings.

Eighth: To provide wings of this class in which the flaps are suddenly forced upwardly and downwardly at the ends of the respective up and down strokes of the wings so as to cause further forward propulsion of the aircraft.

Ninth: To provide novel and simple means for causing such tilting and movement of the flaps at the trailing edge of the wings.

Tenth: To provide, as a whole, a novel wing construction for ornithopters and novel and simple mechanism for actuating the same.

Eleventh: To provide novel means in connection with the tail of the aircraft for controlling the lateral stability of the craft when in flight, and Twelfth: To provide an aircraft of this class which is simple and economical of construction proportionate to its functions, and one which will not readily get out of order.

Figure 2:
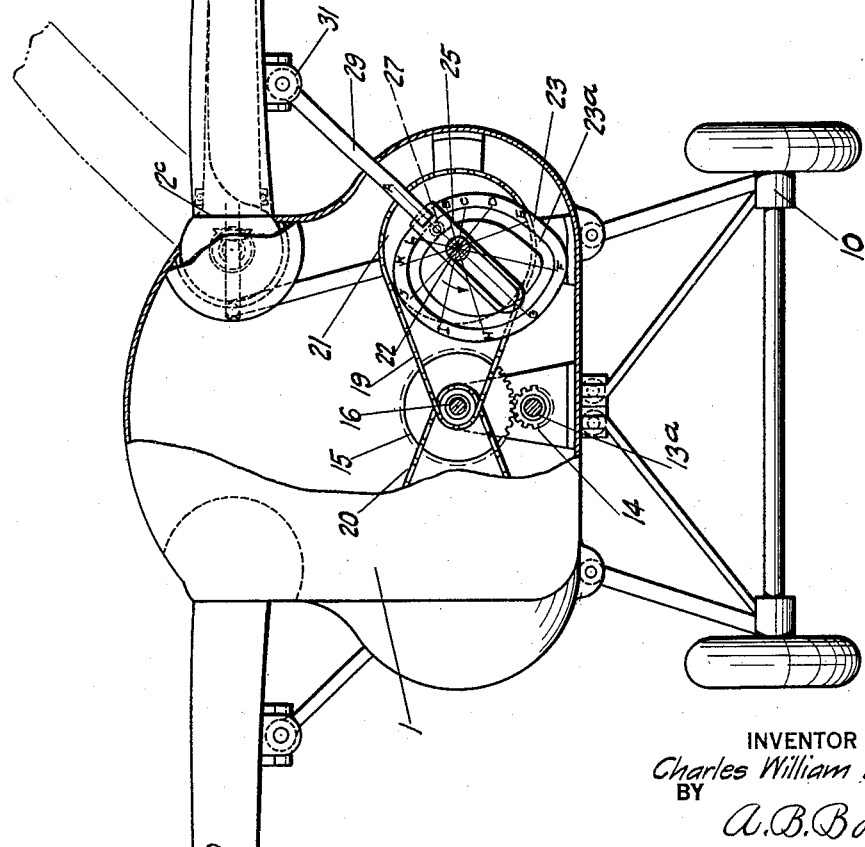

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a fragmentary top view of my new aircraft in one form of construction, certain parts and portions thereof being broken away and in sections to facilitate the illustration; Fig. 2 is a partial front elevational and a partial sectional view thereof taken on the line 2—2 of Fig. 1; Fig. 3 is a fragmentary sectional elevational view thereof taken through 3—3 of Fig. 1; Fig. 4 is another fragmentary sectional view thereof taken through 4—4 of Fig. 1, showing the mechanism for tilting the flaps at the trailing edge of the wings; Fig. 5 is a fragmentary sectional view thereof taken through 5—5 of Fig. 1, showing primarily the mounting of the wing on the body and also showing a portion of the mechanism for tilting the flaps at the trailing edge of the wing; Fig. 6 is a transverse sectional view taken through 6—6 of Fig. 1, showing the wing construction and showing by dotted lines the upwardly and downwardly directed positions of the flaps at the trailing edge of the wing; Fig. 7 is another transverse sectional view taken through 7—7 of Fig. 1 showing the arms for oscillating the wings; Fig. 8 is a transverse sectional view through the wing and flap showing the same in the position relative to the horizontal plane when the wing is forced downwardly; Fig. 9 is another transverse sectional view through the wing as it appears when the wing is forced upwardly; and Fig. 10 is a top view of the tail of the aircraft.

Like characters of reference refer to similar parts and portions throughout the several views of the drawings.

My ornithopter, as illustrated in the drawings, consists essentially of a body 1, a pair of wing supports 2 pivotally mounted at the opposite sides of the body, wings 3 mounted on the wing supports, propelling flaps 4 at the trailing edges of the wings, and mechanism for oscillating the wings and flaps in their several movements.

Aside from these essential elements, the body is provided preferably with horizontal and vertical stabilizers 5 and 6, respectively, elevators 7 at the trailing edge and intermediate the ends of the horizontal stabilizer, ailerons 8 at the trailing edge of the horizontal stabilizer but outwardly from the elevators, and a rudder 9 supported by the vertical stabilizers. It will be noted that in my present type of ornithopter, all control surfaces are mounted on the tail.

The body 1 may be similar in construction to that of the fuselage of the ordinary airplane and provided with a suitable undercarriage 10 as in airplane construction, but the body is modified slightly to adapt the same to my particular ornithopter construction. The body 1 is provided at its opposite sides and near the upper portion thereof with a pair of substantially cylindrical recesses 1a which extend longitudinally with respect to the body. These recesses serve as journals and are provided with suitable bearings 11 for this purpose. In these cylindrical, or substantially cylindrical, recesses are positioned correspondingly shaped cylindrical bearing portions 2a which are mounted on the bearings 11. From the forward ends of the cylindrical bearing portions 2a are extended transversely thereto and outwardly from the body bearing arms 2b which are preferably tubular members and tapered outwardly from the bearing portions 2a. Upon these bearing arms 2b, which are of considerable length, are pivotally mounted the wings 3, the wings being mounted thereon by suitable ball or other bearings. The wings 3 are provided with relatively thick leading portions 3a, as shown in Figs. 5, 6, 7, 8 and 9, for receiving the bearing arms 2b. The inner ends of the wings are flat and are positioned tightly against but shiftable relative to flat surfaces 2c at the outer or exposed sides of the cylindrical bearing portions 2a. It will be noted that the pivotal mounting for the wings is substantially streamlined with respect to the body.

At the trailing edge of the wings are rotatably mounted flexible flap supporting shafts 12 which extend from the tip of the wings into the cylindrical bearing portions 2a and preferably through arcuate slots 2d in the flat sides 2c of such bearing portions, as shown in Fig. 5. These flexible shafts consist in this instance of short lengths 12a of rods or tubes which are connected by universal joints 12b. The purpose of the shafts 12 will be hereinafter specifically set forth. The flexibility of the shafts 12 is essential when the trailing edge of the wing is curved downwardly, as shown in Fig. 2, or is otherwise distorted.

The under side of each wing is provided with a specific and relatively deep concavity 3b simulating very closely the concavity at the under side of the wing of a bird, but by reason of the mounting of the wing so as to change its angle of incidence, the leading edge is made considerably thicker than the leading edge of a wing of a bird. This thickness of the leading edge may be reduced considerably by reducing the size of the bearing arms 2b, or the length thereof. The forward portion of the concavity, adjacent the leading edge of the wing is of greatest depth and is abruptly curved downwardly, as indicated by 3c, this abrupt curve extending in a relatively sharp angle downwardly and forwardly and merging with the rounded lower and forward portion of the wing. The rear portion of the concavity is entirely different and extends backwardly on a very gradual curve which is gradually inclined backwardly and downwardly toward the trailing edge of the wing. This concavity catches the air, as the wing is forced downwardly, and causes the air to be forced backwardly by reason of the abrupt curvature and angularity at the forward end and the gradual curvature and angularity at the rear portion of the concavity, thus propelling the aircraft forwardly. The forward propulsion of the aircraft is still more pronounced by changing the angle of incidence of the wings. As the wing is raised, the leading edge is first raised with respect to the trailing edge until the wing assumes a position, as shown in Fig. 9. The whole of the wing is then raised. As the wing is forced downwardly, the leading edge is lowered with respect to the trailing edge, increasing the inclination at the forward portion of the concavity and decreasing such inclination at the rear portion of the concavity, thus, more effectively, forcing the air rearwardly and the craft forwardly.

The wings are raised and lowered in a manner similar to the movement of the wings of a bird. In this instance, such movement or oscillation of the wings is effected by a single motor 13 which is mounted at the forward and lower portion of the body. The shaft 13a of this engine extends backwardly and is provided with a pinion 14 which meshes with a large gear 15 mounted on a stub shaft 16 on which are mounted a pair of sprockets 17 and 18 which are connected by sprocket chains 19 and 20 to large sprocket wheels 21 mounted on cam shafts 22 at the opposite sides and lower portion of the body 1. On each of the cam shafts 22 are mounted, in spaced apart relation, a pair of wing actuating cams 23 and 24 which in this instance are face cams provided with cam grooves 23a and 24a. These cams are operatively connected to the wings by connecting rods which consist in this instance of yokes 25 and 26 slidably mounted on the shaft 22 and provided with rollers 27 and 28 at one side which extend into the cam grooves 23a and 24a, and rods 29 and 30 pivotally connecting the outer ends of the yokes to pivot blocks 31 and 32 which are pivotally connected to the wing 3 at the leading and trailing edge and at the under side thereof. The pivotal connections of the rods 29 and 30 to the yokes 25 and 26 are on axes transverse to the longitudinal axis of the shaft 22. The pivotal connections of said rods to said pivot blocks pass through the pivotal axes of the blocks 31 and 32 with respect to the wing. Thus, as the shaft 22 is rotated, the rollers 27 and 28 are forced outwardly and inwardly, causing the rods 29 and 30 to reciprocate and the wings to oscillate.

The cams are so constructed that the wings are raised during a considerably shorter period of time than the time consumed during the downward movement, and they are also so constructed and arranged relative to each other that the angle of incidence is increased as the wings are raised and decreased or reversed as the wings are lowered. In Figures 2 and 3, the corresponding portions of the cams may be seen by the relation thereof to the radius vectors laid out on the cams. The low position of cam 23 is indicated by the radius vector A. As the shaft 22 is rotated in the direction of the arrow, the roller is quickly forced outwardly to a point F, which is less than a half circle from the low point A. From the point F, which is the greatest distance outwardly from the axis of the shaft 22, the cam is curved inwardly on an Archimedes spiral, to the point A. This spiral or inwardly directed curve extends over more than a half circle. Thus, the wing is raised considerably faster than it is lowered or drawn downwardly.

In the cam 24, the portion of the cam between the radius vector A and beyond the radius vector B is arcuate. Thus the trailing edge of the wing, at the pivotal connection with the rod 30, remains substantially stationary, while the leading edge is raised. Such movement causes the wing 3 to be pivoted downwardly about the bearing arm 2b. From between the radius vectors B and C, the cam is curved outwardly to approximately the point F. Thus, when the angle of incidence is increased, the wing is raised without further changing such angle. As the point F on the cam 23 reaches the roller 27, the wing is immediately thereafter drawn downwardly at its leading edge. But the trailing edge is raised with respect to the leading edge by reason of the lowering of the leading edge and the holding of the trailing edge stationary, except for the oscillation about the body. The cam 24 is arcuate between the radius vectors F and H, thus permitting such decrease in the angle of incidence. From the point or radius vector H, the cam is curved inwardly on substantially an Archimedes spiral to the vector A. Thus it will be seen that the leading edge is lowered before the trailing edge until the angle of incidence is decreased or reversed; then the whole wing is lowered without further change of the angle of incidence until the portions A of the cams are opposite the rollers, when the leading edge is again raised.

On the shafts 12 are mounted airfoils 4 which are in the form of flaps which extend backwardly from the shafts and form substantially backward extensions of the wings from the trailing edges thereof, corresponding to the primary and secondary wing feathers of a bird. These flaps are rotated with the shafts upwardly and downwardly, as shown in Figs. 8 and 9, and by dotted lines in Fig. 6. Such tilting of the flaps is effected by cams 41 which are mounted at the rear ends of the shafts 22. These cams are also face cams, and are provided with cam grooves 41a in which are positioned rollers 42, one for each cam. Each of the rollers is rotatably mounted on a connecting rod 43 which extends from the shaft 22 to the free end of an arm 44 with which it is pivotally connected at its upper end. The lower end of the connecting rod 43 is provided with a yoke portion 43a which extends over and is slidable with respect to the shaft 22 and is guided thereby as the connecting rod 43 is reciprocated by the cam engaging the roller 42. The arm 44 is secured to a stub shaft 45 which is rotatably mounted in suitable brackets 46 supported by the body 1. The shaft 45 is coaxial with the cylindrical bearing portion 2a of the support 2 and extends thereinto from the rear end thereof. The end of the stub or secondary shaft 45 is connected, by a universal joint 47, to another stub shaft 48 on which is telescopically mounted the hub of a bevel gear 49 which meshes with a bevel gear 50 secured to the end of the rockshaft 12 extending into the cylindrical bearing portion 2a of the support 2 through the slot 2d. The bevel gears are held in mesh by an angular yoke member 51 which extends around the hubs of the bevel gears 49 and 50, as shown best in Figure 1.

As the wings are raised, when the gears 49 are held stationary, the gear 50 tends to rotate, causing the flaps 4 to be directed downwardly with respect to the wings. But at the initial upward movement of the wings, the forward portions of the wings are raised with respect to the rockshafts 12 which are held in non-rotating relation with respect to the gears 49. During this movement, the rockshafts are lowered in the slots 2d, that is, the cylindrical bearing portions are rotated, causing the rockshafts 12 to be lowered relative thereto. Such latter movement of the wings tends to tilt the flaps upwardly. Thus these several movements of the wings substantially neutralize any movements on the part of the flaps with respect to the wings. The flaps are, however, raised and lowered about their pivotal axes by the cams 41. During the initial upward movement of the leading edges of the wings, the rollers 42 move in the cam grooves from the radius vectors A to B, and as both leading and trailing edges of the wings are raised, the rollers 42 are continuously drawn inwardly toward the axes of the shaft 22, which causes the flaps to be directed or deflected downwardly, as shown in Fig. 9. Before the wings are shifted to their extreme raised positions, the rollers 42 are forced suddenly upwardly so that the flaps are in substantial alignment with the trailing edge portions of the wings when the wings reach their uppermost positions. Such positions of the rollers 42 are obtained by the portions of the cams 41, designated F, which correspond with the portions F on the cams 23 and 24. Such sudden upward movement of the flaps causes a forward propelling force upon the aircraft. During the initial downward movement, the flaps remain in the last mentioned positions with respect to the wings, but as the whole wings are forced downwardly, the flaps are deflected upwardly, as shown in Fig. 8, until the wings near their lower positions, such upward deflection of the flaps being effected by the outward curves of the cams 41 from the portions designated by the radius vector F to the portion between the vectors J and K. The flaps are then suddenly moved downwardly as the rollers 42 pass through the cam grooves from the portion between the radius vectors J and K to the radius vector A, causing further forward propulsion of the aircraft. Such movement of the flaps is repeated during each upward and downward stroke or oscillation of the wings.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In an ornithopter, a body having relatively large circular recesses at the opposite sides of and within the confines of the body, the axes of the circular recesses extending longitudinally with respect to the longitudinal axis of the body, and a pair of wings, one positioned at each side of the body, each wing having at its inner end a large circular bearing portion mounted in the circular recess at the corresponding side of the body.

2. In an ornithopter, a body having relatively large circular recesses at the opposite sides of and within the confines of the body, the axes of the circular recesses extending longitudinally with respect to the longitudinal axis of the body, and a pair of wings, one positioned at each side of the body, each wing having at its inner end a large circular bearing portion mounted in the circular recess at the corresponding side of the body, the diameter of the recess and bearing being greater than the thickness of the wings.

3. In an ornithopter, a body, wing supports pivotally mounted at the opposite sides of the body on axes extending longitudinally with respect to the body, said supports having bearing portions at their forward ends with the axes of the bearing portions extending substantially transversely with respect to the pivotal axes of the supports, and wings pivotally mounted at their leading edges on said bearings, said wings being also pivotally mounted with said supports about the pivotal axes of said supports.

4. In an ornithopter, a body, wing supports pivotally mounted at the opposite sides of the body on axes extending longitudinally with respect to the body, said supports having bearing portions at their forward ends with the axes of the bearing portions extending substantially transversely with respect to the pivotal axes of the supports, wings pivotally mounted at their leading edges on said bearings, said wings being also pivotally mounted with said supports about the pivotal axes of said supports, and means for raising and lowering said wings about the longitudinal pivotal axes of the supports, and for varying the angle of incidence of the wings during their upward and downward movements.

5. In an ornithopter, a body, wing supports pivotally mounted at the opposite sides of the body on axes extending longitudinally with respect to the body, said supports having bearing portions extending substantially transversely with respect to the pivotal axes of the supports, wings pivotally mounted at their leading edges on said bearings, said wings being also pivotally mounted with said supports about the pivotal axes of said supports, a pair of wing actuating connecting rods at the opposite sides of the body, one end of the connecting rods of each pair being pivotally connected to the under side of each wing outwardly from the body and respectively at the leading and trailing edges of the wings, and means within the body and at the lower portion thereof, said means being connected to the opposite ends of the connecting rods for reciprocating the same.

6. In an ornithopter, a body, wing supports pivotally mounted at the opposite sides of the body on axes extending longitudinally with respect to the body, said supports having bearing portions at their forward ends with the axes of the bearing portions extending substantially transversely with respect to the pivotal axes of the supports, wings pivotally mounted at their leading edges on said bearings, said wings being also pivotally mounted with said supports about the pivotal axes of the supports, a pair of wing actuating connecting rods at the opposite sides of the body one end of the connecting rods of each pair being pivotally connected to the under side of each wing outwardly from the body and respectively at the leading and trailing edges of the wings, means at the lower portion of the body connected to the opposite end of the forward connecting rod for reciprocating the same, and other means positioned in the lower portion of the body behind the first means and connected to the rear connecting rod for reciprocating the same in retarded relation with respect to the reciprocation of the forward connecting rod.

7. In an ornithopter, a body, wing supports pivotally mounted at the opposite sides of the body on axes extending longitudinally with respect to the body, said supports having bearing portions at their forward ends with the axes of the bearing portions extending substantially transversely with respect to the pivotal axes of the supports, wings pivotally mounted at their leading edges on said bearings, said wings being also pivotally mounted with said supports about the pivotal axes of the supports, cam means supported by the body and mounted on axes extending longitudinally with respect to the longitudinal axis of the body, and connecting rod means extending from the cam means to the wings outwardly from the body, said cam means having substantially spiral cam surfaces extending around the axis of the cam means from the outer portion toward the axial portion thereof over an angle greater than a half circle for forcing the wings downwardly, said cam means having other cam surfaces connecting the ends of the first mentioned cam surfaces and extending through an angle less than a half circle for forcing the wings upwardly during a shorter period than the time consumed for the downward movement of the wings.

8. In an ornithopter, a body, wing supports pivotally mounted at the opposite sides of the body on axes extending longitudinally with respect to the body, said supports having bearing portions at their forward ends with the axes of the bearing portions extending substantially transversely with respect to the pivotal axes of the supports, wings pivotally mounted at their leading edges on said bearings, said wings being also pivotally mounted with said supports about the pivotal axes of the supports, a pair of cam shafts mounted at the lower portion of the body at the opposite sides of and parallel to its longitudinal axis, cams mounted on said cam shafts at the forward and rear end portions thereof, and connecting rods extending diagonally from said cams through said body and connected at their outer ends to the under side of the wings adjacent the leading and trailing edges thereof.

9. In an ornithopter, a body, wing supports pivotally mounted at the opposite sides of the body on axes extending longitudinally with respect to the body, said supports having bearing portions at their forward ends with the axes of the bearing portions extending substantially transversely with respect to the pivotal axes of the supports, wings pivotally mounted at their leading edges on said bearings, said wings being also pivotally mounted with said supports about the pivotal axes of the support, a pair of cam shafts mounted at the lower portion of the body at the opposite sides of and parallel to its longitudinal axis, cams mounted on said cam shafts at the forward and rear portions thereof, and connecting rods extending diagonally from said cams through said body and connected at their lower ends to the under side of the wings adjacent the leading and trailing edges thereof, the rear cams being in retarded relation to the forward cams whereby the angle of incidence of the wings is increased when the wings are forced upwardly, and the angle of incidence decreased or reversed when the wings are forced downwardly.

10. In an ornithopter, a body, wings pivotally mounted at one end and at the opposite sides of the body, propelling flaps at the trailing edges of the wings, means for oscillating the wings about their pivotal axes, and other means for oscillating the flaps during the oscillation of the wings.

11. In an ornithopter, a body, wings pivotally mounted at one end at the opposite sides of the body, propelling flaps at the trailing edges of the wings, a shaft in the lower portion and opposite sides of the body, means connecting the forward portions of the shafts to the wings for oscillating the same about their pivotal axes, and means at the rear end of the shafts for oscillating the flaps.

12. In an ornithopter, a body, wings pivotally mounted at one end at the opposite sides of the body, propelling flaps at the trailing edges of the wings, a shaft in the lower portion and opposite sides of the body, means connecting the forward portions of the shafts to the wings for oscillating the same about their pivotal axes, cams at the rear ends of the shafts, secondary shafts mounted above the first shafts and operatively connected to said flaps, arms mounted on the secondary shafts, and connecting rods extending from the arms to the cams.

13. In an ornithopter, a body, wing supports pivotally mounted at the opposite sides of the body on axes extending longitudinally with respect to the body, said supports having bearing portions at their forward ends with the axes of the bearing portions extending substantially transversely with respect to the pivotal axes of the supports, wings pivotally mounted at their leading edges on said bearings, said wings being also pivotally mounted with said supports about the pivotal axes of said supports, and flaps pivotally mounted on the trailing edge of the wings and adapted to be deflected downwardly as the wings move upwardly and to be deflected upwardly as the wings move downwardly.

14. In an ornithopter, a body, wing supports pivotally mounted at the opposite sides of the body on axes extending longitudinally with respect to the body, said supports having bearing portions at their forward ends with the axes of the bearing portions extending substantially transversely with respect to the pivotal axes of the supports, wings pivotally mounted at their leading edges on said bearings, said wings being also pivotally mounted with said supports about the pivotal axes of said supports, flaps pivotally mounted on the trailing edge of the wings, shafts mounted at the lower portion of the body at the opposite sides of the longitudinal axis thereof, means connecting the forward portions of the shafts to the wings at their leading and trailing edges for oscillating the wings with the supports about the pivotal axes of the supports on the body, and also for oscillating the wings about the transverse bearings on the supports, cams at the rear ends of the shafts, secondary shafts mounted coaxial with the pivotal axes of the supports on the body, arms on the secondary shafts, connecting rods connecting the arms to the cams, other shafts for supporting and connecting the flaps at the trailing edges of the wings, bevel gears connecting the last mentioned shafts to the secondary shafts, and universal joints interposed between the bevel gears and the secondary shafts.

15. In an ornithopter, a body, wings pivotally mounted at one end on the body and extending laterally therefrom, cams mounted on the lower portion of the body on axes extending longitudinally with respect to the body, and connecting rods pivotally connecting the wings outwardly from the body to the cams, each cam having a substantially spiral cam surface extending from its outer portion toward its axial portion over an angle greater than a half circle, for forcing the wings downwardly, the ends of the spiral cam surface being connected by a cam surface of less curvature and over an angle of less than a half circle, for forcing the wings upwardly.

In testimony whereof, I have hereunto set my hand at San Diego, California, this 27th day of August, 1930.

CHARLES WILLIAM STROBELL.